Dec. 10, 1968  A. STUBBMANN  3,415,012
BULB PLANTING AND RECOVERY DEVICE AND METHOD
Filed Aug. 10, 1966
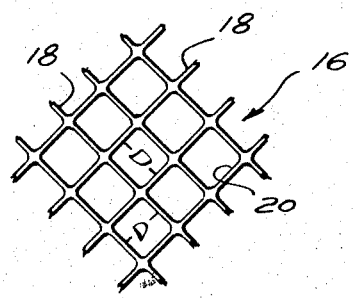
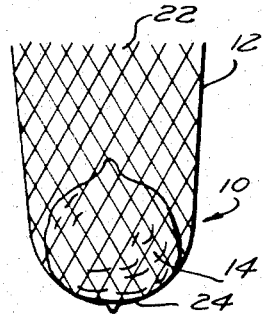
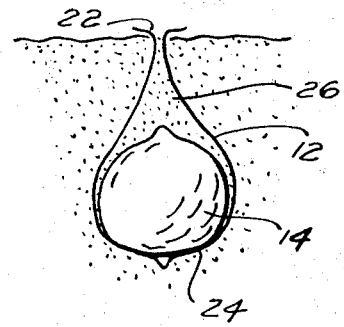
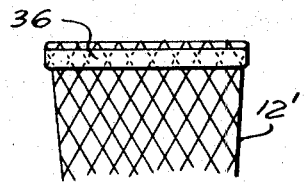
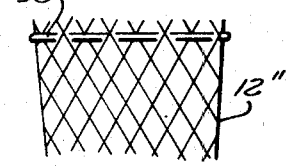
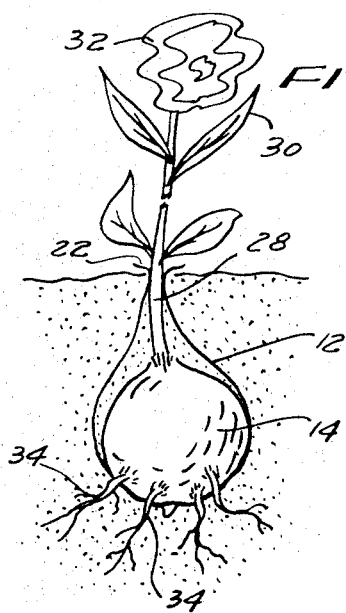
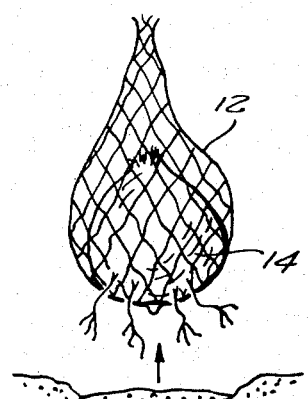
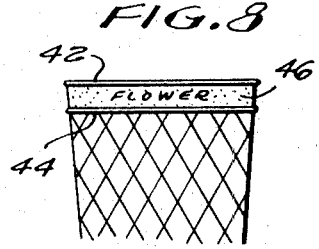
INVENTOR
ALBERT STUBBMANN
BY
Kirschstein, Kirschstein & Ottinger
ATTORNEYS

United States Patent Office 3,415,012
Patented Dec. 10, 1968

3,415,012
BULB PLANTING AND RECOVERY
DEVICE AND METHOD
Albert Stubbmann, 127 Executive Drive,
Manhasset Hills, N.Y. 11040
Filed Aug. 10, 1966, Ser. No. 571,485
1 Claim. (Cl. 47—37)

ABSTRACT OF THE DISCLOSURE

A tubular bag with an open mouth and closed bottom. The bag is formed from limp deformable stranded netting of a synthetic resin inert to materials in the soil. The bag contains a single bulb. The netting forms a large number of similar contiguous large apertures. The minimum transverse dimension of each aperture is a great number of times larger than the thickness of the netting. The bag is adapted to be placed in a hole in the ground at which time bulb roots can pass through the apertures in the bag without interference. Also, due to the large aperture the soil can contact the bulb directly. The length of the bag is sufficiently great so that when the bag is in the ground the mouth of the bag will be above the ground. At the end of a growing season when the leaves and stalks have withdrawn from the bulb and the bulb is wholly below the ground, the bulb nevertheless may be found and recovered by grasping the mouth of the bag and pulling the bag with the bulb therein out of the ground. The great number and large size of the apertures in the netting allows free ventilation of the bulb and an essentially unimpaired view of the bulb when the bag is out of the ground.

---

The present invention relates to a device and method for planting a bulb in the ground and for recovery of the bulb after its flower, stalk and leaves have withered and fallen off.

It is the primary object of my invention to provide a device that can be used, especially by a home gardener, for planting the bulbs of flowering plants and which will enable the gardener to recover his bulbs from the ground after the bloom, leaves and the stalk of the plant have withered, leaving no sign above the ground of the bulb's location.

It is another object of my invention to provide a bulb planting and recovery device of the character described wherein the device constitutes a bag formed from limp stranded netting having a great number of large contiguous openings surrounding one another so that when the device with its bulb therein is planted in the ground, the stalk may pass upwardly and the roots of the bulb may pass downwardly through the bag without interference and so that the soil will come directly into contact with the surface of the bulb, promoting proper growth.

It is yet another object of my invention to provide a bulb planting and recovery device of the character described wherein the large contiguous openings permit essentially unimpeded view of the bulb through the bag allowing, during storage, inspection of the condition of the bulb as well as identification of the bulb, said openings also permitting free flow of air through the bag so as to ventilate the bulb and prevent rotting of the same.

It is still a further object of my invention to provide a bulb planting and recovery device of the character described which contains but a single bulb and which serves as a convenient container for the bulb both while the bulb is in the ground during the growing season and thereafter while the bulb is kept in storage during its hibernation period.

It is another object of my invention to provide a bulb planting and recovery device of the character described wherein the device comprises a bag which is tubular and elongated and a method for using the same so that when a bag with a bulb therein is planted in the ground, the top of the bag is located above ground to serve as a marker for the location of the bulb after the stalk and leaves of the bulb-fostered plant have withered and fallen away in the fall.

It is still a further object of my invention to provide a bulb planting and recovery device of the character described wherein indicia is carried by each bag so as to identify the bulb therein.

It is still another object of my invention to provide a bulb planting and recovery device of the character described which is suitable for manufacture by mass production techniques, which can be sold at a relatively inexpensive price and which will be accepted by home gardeners as a great aid in recovering bulbs whereas in the past many of their bulbs after the growing season had been lost in the ground.

Other objects of my invention in part will be obvious and in part will be pointed out hereinafter.

My invention accordingly consists in the features of the construction, combination of elements, arrangements of parts and series of steps which will be exemplified in the bulb planting and recovery device and method hereinafter described and of which the scope of application will be indicated in the appended claims.

In general and in accordance with the teaching of my invention, I provide a device for planting a bulb in the ground and for recovery of the bulb from the ground after its flower, stalk and leaves have withered and fallen off. Said device includes an elongated substantially tubular bag formed from limp stranded netting and one single bulb within the bag. The bag is formed from a synthetic resin filamentary material which is inert to soil constituents, nutrients and water. The bag has an open mouth and a closed bottom wall and side walls.

The netting of the bag is characterized by a multiplicity of similar contiguous large apertures, each aperture being surrounded by other apertures and each aperture having a minimum transverse dimension a great number of times larger than the thickness of a strand of the netting.

The device is utilized by planting the bag and its contained bulb in a hole in the ground. Due to the great number of apertures and their relatively large dimensions as compared to the strands of the netting, the bulb roots grow and pass directly through the bag and into the soil surrounding the bag. The stalk can also pass upwardly through the bag. By having a very large ratio of open space compared to bag material, the stalk and roots are not measurably obstructed by the bag.

Further, the large size of each aperture and the great number of apertures encourages the soil surrounding the bag to come directly into contact with the bulb. This direct contact of the soil with the bulb over all of the surface of the bulb promotes good growth of the plant. The bag with the bulb therein is planted so that the mouth of the bag is located above the ground level, this being accomplished by digging the hole in the ground to an appropriate depth.

The bulb and the bag remain in the ground during the growing season, and in the course thereof, as has been mentioned, the stalk passes either through the mouth of the bag or through the netting surrounding the mouth and the roots grow outwardly from the bulb through the netting and into the soil. After the growing season, as is normal, the stalk and leaves wither and fall off the bulb. Absent my invention, there would be no visible sign of the bulb above ground. When the time arrived at the end of fall to remove the bulbs from the ground for winter storage, the bulbs would be difficult to locate and many might be lost. This is especially the case with bulbs which are planted 4″ to 8″ below the surface level. The previous recovery technique consisted of haphazard digging in the ground to find the bulbs.

With my invention, the top of the bag, that is its mouth, is located slightly above ground so that the general location of the bag can be readily found when the foliage of the bulb has withered and fallen off. To recover the bulb, the ground over and around the bulb is loosened with a pitchfork, and the top of the bag is grasped and pulled upwardly thereby lifting the bulb within the bag out of the ground. By lightly shaking the bag, excess dirt falls away, while keeping the root structure of the bulb intact.

Thereafter, the bulb still inside of the bag is stored until the next growing season. The numerous large apertures of the bag permit free passage of air through the bag and around the bulb, ventilating the same and thereby preventing the bulb from rotting during the winter. Such spoilage of the bulb would be likely to occur if no such excellent ventillation were permitted and the bulb became excessively moist. Moreover, when spring again arrives, the bulb can be easily inspected by simply observing the bulb through the numreous large apertures in the netting bag. Thus, the home gardener can quickly and easily see the condition of the bulb and may identify the species of bulb. Further the large apertures allow the bulb to be readily and thoroughly dusted with suitable chemicals and to be inspected when on sale at a garden store.

In the drawings, in which are shown various possible embodiment of my invention, FIG. 1 is a greatly enlarged view of a small portion of the stranded netting from which the bag of the present invention is formed;

FIG. 2 is a side view of my bulb planting and recovery device showing the same prior to planting;

FIG. 3 is a side view thereof as it appears after having been placed into a hole in the ground;

FIG. 4 is a side view thereof as it appears after a stalk, flower, and leaves have grown upwardly from the bulb, as well as roots having grown downwardly therefrom through the netting of the bag;

FIG. 5 is a side view thereof, showing the same being removed from the ground after return to a dormant state; and FIGS. 6, 7 and 8 show three different modes of identifying the type of bulb within the bag.

Referring now in detail to the drawings, the reference numeral 10 denotes my bulb planting and recovery device. Said device includes two components; the first is a bag 12 and the second is a single plant bulb 14.

The bag 12 is formed from limp open netting 16 made from a synethetic resin which is inert in soil, that is, will not react when exposed to soil constituents, nutrients or water. Polyethylene is a suitable material. The netting 16 is formed from strands arranged in a reticulated formation as by crossing and bonding the strands to one another at all crossing points. The strands define a great multiude of diamond shaped apertures 20 which all pass through the bag. The apertures 20 surround one another and are of uniform configuration. They have a minimum transverse dimension D which is a great number of times thicker than the thickness of a strand. For example, said transverse dimension D may be in the order of 30 times greater than the thickness of the strand 18. In a suitable form of my invention, the thickness of a strand is about 1/64″ and the dimension D is about 1/2″. The netting can be considerably deformed, and will tend to return to its open shape when the deforming force is removed.

The bag 12 is elongated, has an open mouth 22 and a closed bottom 24 and is substantially of tubular configuration. The single bulb is situated within the bag at its bottom, and the bag is of appropriate dimension to easily accommodate a single bulb. Tulip bulbs and gladiola bulbs are typical of the bulbs used in my invention.

My invention is utilized by placing my device, that is, the single bulb 14 within the bag 12, into a hole 26 dug in the ground. The hole 26 is of a depth such that the mouth 22 of the bag remains above the ground level and the boundary of the mouth is spread upon the ground. The emplacement into the ground is done at the time that bulbs would be planted into the ground before the start of the growing season. The mouth of the bag is held closed and then dirt is heaped into the bag and over the bulb, filling the remainder of the hole (see FIG. 4). Optionally, the bag mouth is left open; however, removal of the bag is easier if the mouth is closed. Due to the large area of the apertures compared with the strands of the apertures, the bottom and side surface of the bulb abutting the bag netting almost entirely comes into contact with soil. This promotes good growth of the bulb.

During the growing season, the stalk 28 of the bulb 14 grows upwardly with leaves 30 and a flower 32 sprouting from the stalk in due course (see FIG. 4). The stalk passes through any one of the apertures at the top of the bag adjacent the bag mouth without interference due to the large size of the apertures; the stem may by chance pass directly through the mouth.

The roots 34 of the bulb, due to the great multiplicity of apertures 20, pass readily through the bag and deeply into the soil. The leaves and flower of the plant hide the exposed boundary of the bag mouth during the growing season. Because of the large area of each aperture and the comparatively small space taken up by the strands 18 there is essentially no obstruction to the outward growth of the roots 34. Since the netting is limp and readily deformable, the roots and stalk as they protrude from the bulb and pass through the netting push individual strands with which they come into contact to one side.

After the growing season the stalk 28 as well as the leaves 30 and the flower 32 of the plant wither, die and become displaced, leaving no visible indication of the location of the bulb, were it not for my invention.

At the end of the growing season and when it is desired to remove the bulb from the ground, the mouth 22 of the bag is grasped by the hand of the gardener and is pulled upwardly (see FIG. 6). Preliminary loosening of the surrounding soil, as with a pitchfork, is required. The uprooting of the bag carries with it the bulb contained within the bag. Any excess soil is removed simply by shaking the bag, the soil falling through the large aperture onto the ground.

During the winter season the bulb in the bag may be hung from any support in a storage area; the aperture due to their great number and their large size compared to the strands permit free ventilation of the bulb so that moisture does not gather and rot the bulb. Moreover, the bulb may be viewed at any time during the storage period and prior to replanting to inspect its condition and to identify its species.

Should it be desired to further identify the bulb within the bag, indicia may be carried by the bag for this purpose. In FIG. 6, I disclose a band 36 of plastic material which is bonded as by adhesives or by heat and pressure to the top exterior rim of the bag 12′. Said strip is of a color which corresponds to the color of the flower produced by the single contained bulb.

In FIG. 7, the identifying means comprises a length of plastic cord 38 of a color corresponding to the color of the flower produced by the bulb. The cord is interwoven through a ring of apertures at the top rim of the bag 12″. In FIG. 8, the identifying means comprises a band 40 of plastic material which is bounded by borders of color 42, 44. The borders correspond to the color of the flower. The band has a central area 46 formed from a roughened plastic material which can be written upon, as by a ball point pen, by the home gardener.

It thus will be seen that I have provided bulb planting and recovery device and method which achieve the several objects of my invention and which are well adapted to meet the conditions of practical use.

As various possible embodiments might be made of the above invention and as various changes might be made in the embodiments set forth, it is to be understood that all matter herein described or shown in the accompanying drawings is to be interpreted as illustrative and not in a limiting sense.

I claim:

1. A reticulate large-apertured bulb planting and recovery device, said device comprising an elongated substantially tubular bag formed from limp deformable netting of a synthetic resin material inert to soil constituents, nutrients and water, said bag being composed of a plurality of strands arranged in reticulated formation by crossing and bonding the strands to one another at all crossing points, the strands being about 1/64" thick, the bag having an open mouth, said netting being provided with a multiplicity of diamond-shaped contiguous large apertures passing through the netting, each aperture having a transverse dimension of about 1/2", said bag being adapted to contain a single bulb so that, when the device is planted, the stalk and bulb roots will pass therethrough readily when said bag is in collapsed form about the bulb whereby the bulb will directly contact the soil surrounding the bag, the length of the bag being sufficiently great so that when the bag is placed in the ground the mouth of the bag will be above the ground, the bulb then growing with its stalk passing upwardly through the bag and its roots passing through the apertures in the netting into the soil, said bag further including at the top thereof a band attached thereto, said band being of a plastic material having a roughened surface on a portion thereof adapted to receive writing.

References Cited

UNITED STATES PATENTS

| | | | |
|---|---|---|---|
| 2,252,073 | 8/1941 | Gray | 47—37 |
| 2,394,192 | 2/1946 | Mann | 47—37 |
| 2,902,795 | 9/1959 | Heigl et al. | 47—58 |
| 2,945,323 | 7/1960 | Pratt | 47—37 |
| 3,040,966 | 6/1962 | Crane | 229—53 |

ROBERT E. BAGWILL, *Primary Examiner.*

U.S. Cl. X.R.

229—53